Patented Mar. 29, 1932

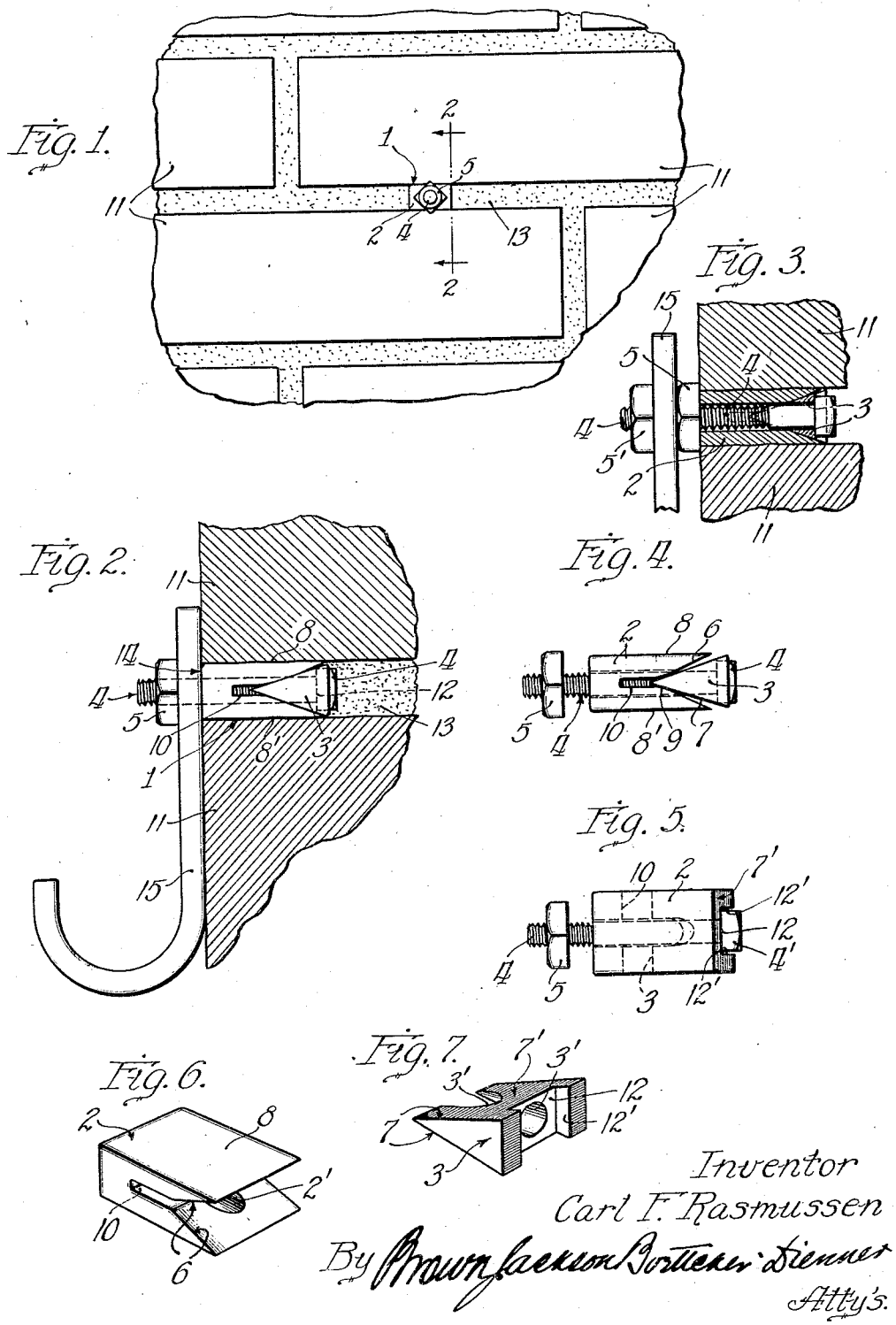

1,851,292

UNITED STATES PATENT OFFICE

CARL F. RASMUSSEN, OF CHICAGO, ILLINOIS

EXPANSION BOLT

Application filed May 24, 1928. Serial No. 280,132.

My invention relates to expansion bolts.

While the particular embodiment which I shall herein describe is adapted to be used in fastening brackets, hangers, and the like to brick walls, the invention is not to be limited to the specific form shown, nor to the particular use herein described.

Expansion bolts for securing brackets and like articles to masonry are well known; but, particularly in attaching brackets to brick walls, I have found nothing on the market satisfactory. The difficulty with devices of a prior art resides chiefly in the fact that they produce localized pressures which tend to crack the brick or to gain only an insecure hold upon the bricks.

The usual manner of attaching them is to drill a round hole either into the bricks or into the mortar between the bricks, this hole being of a larger diameter than the shell of the expansion bolt, so as to receive the same readily. Thereupon, the expansion bolt is inserted and expanded but due to the cylindrical surfaces not having a close fit, the cylindrical shell bears only at a few points and, at best, on a very small or limited surface, with resultant cracking or splitting of the masonry without gaining adequate support.

I have conceived the possibility of employing a flat faced expansion bolt with a soft metal face which will do two things: First, provide an extensive bearing surface and second, due to the soft metal engaging faces of the expansible part of the device, the roughness or projections on the supporting surfaces will embed themselves in the soft metal face and gain a firm and extensive contact without a tendency to cause fracture or pressing of the masonry.

In the preferred form of my invention, I employ a flat, rectangular block of lead or lead alloy, with a slot extending from the rear towards the front, parallel to the larger or engaging faces, the rear edges of the slot being chamfered off to facilitate the entry of the wedge. A wedge of relatively hard metal, which may be a casting, stamping or forging, is connected to the shank of a bolt which extends through the block. By drawing on the shank of the bolt, as by means of a thread and nut, the wedge is drawn or forced into the slot of the block and the pressure is distributed through the body of the block to the supporting surfaces.

Preferably, in mounting the block in brick masonry, I chip out a part of the mortar between bricks and set the device in the slot so provided. It is, generally, not necessary to fill in the slot around the bolt, but, obviously, this may be done.

The block need not be made of a solid piece of lead or soft metal, but may consist of a U-shaped or V-shaped sheet metal stamping, having soft metal faces. Likewise, the wedge need not be a separate piece, but may be formed integral with the shank of the bolt, but I prefer to use a machine bolt, because of cheapness, and let the head of the machine bolt seat in a recess on the back side of the wedge.

Now, in order to acquaint those skilled in the art with the manner of constructing and operating a device in accordance with my invention, I shall describe in connection with the accompanying drawings, a specific embodiment of the invention.

In the drawings:

Figure 1 is a front elevational view of an expansion bolt of my invention, applied to a brick wall;

Figure 2 is a sectional view, taken on line 2—2 of Figure 1, showing a pipe hanger in place;

Figure 3 is a sectional view, showing a different method of fastening pipe hangers and the like;

Figure 4 is a side elevation of the expansion bolt of my invention;

Figure 5 is a plan view of the same; and

Figures 6 and 7 are perspective views of the two main elements of my expansion bolt; the slotted expansible block, and the wedge-shaped member operating therein, respectively.

Similar numerals refer to similar parts throughout the several views.

The device shown in the drawings consists of a slotted expansible block 2 made of lead or the like, a rigid wedge 3 which may be a casting, stamping or the like, a machine bolt 4 and a nut 5. The block 2 and wedge 3 have holes 2' and 3', respectively, to receive the bolt 4. It will be noted in Figure 4, that the inclined surface 6 of block 2 has a greater angle than the inclined surface 7 of wedge 3. The purpose of this is to obtain a distribution of pressure over the gripping surfaces 8 and 8' as the wedge 3 is initially drawn into block 2, contacting therewith at 9. Slot 10 is provided to permit the wedge 3 to move forward until the inclined surface 6 of block 2 can conform with the surface 7 of the wedge 3, due to compression.

This slot 10 is also for the purpose of giving the two expansible halves of the block 2 flexibility so as to aid the surfaces 8 and 8' in conforming to the irregular surfaces of the bricks 11.

Referring to Figures 5 and 7, it will be seen that the wedge 3 has a recess 12 for the reception of the square head 4' of the machine bolt 4. The sides 12' of the recess prevent the bolt head 4' from turning when the nut 5 is drawn up during the fastening or expanding operations.

Figures 1, 2 and 3 show the embodiment of my invention, designated by the numeral 1, as it is applied in actual use. Figures 4 and 5 show the expansion bolt before it is used and it will be seen in Figures 2 and 3 that the wedge 3 has expanded the block 2 and has caused the surfaces 8 and 8' to conform with the irregular surfaces of the bricks 11.

The device of my invention, as has been previously set forth, is first inserted between the bricks 11, after some of the mortar 13 has been removed. After placing the bolt in position, mortar may again be filled in to close the excess opening. In Figure 2, the forward surface 14 of block 2 should be so placed as to be substantially flush with the surfaces of the bricks 11. This is done for the purpose of enabling the pipe-hanger 15 to abut against the surface 14 of block 2 and also against the surfaces of the bricks 11, when the nut 5 is drawn up. Then, drawing up of the nut 5 upon the machine bolt 4 moves the wedge forward, the surfaces 7 of the wedge 3 gradually expanding the lead block 2 as they engage the inclined surfaces 6 of the block.

This operation anchors the bolt, and the same nut 5 can then be used to hold the article to be carried by the bolt 4.

To assure and prevent the wedge 3 from being forced out of engagement with the slotted lead block 2 when the nut 5 is removed, the inclined surfaces 7 are transversely serrated as designated by 7'. In this manner, the wedge 3, when pulled into the lead block 2, causes the serrations 7' on the surfaces 7 to bite into the metal of block 2 and consequently hold the wedge 3 from releasing itself when the nut 5 is removed.

In Figure 3, another method of fastening the hanger 15 or the like is shown, which has only an additional nut 5' to secure the hanger 15, and in this event, the nut 5 is used to accomplish the expanding and anchoring of the bolt 1, and the surfaces 7 of the wedge 3 may, if desired, be transversely serrated. However, such serrations are not essential in this mode of fastening, as the nut 5 prevents the wedge from slipping.

While I have shown the block as made entirely of a piece of lead, or lead alloy or other soft metal, it is to be understood that I may vary the construction of the same, all within my invention, by employing a sheet metal stamping as the main frame or body of the block, with lead facings for distributing the pressure and for embedding the rough surfaces. In a like manner, the construction of the wedge may be varied within my invention, as for example, by making the same integral with the shank of the bolt.

I do not intend to be limited to the details shown or described, except as the same are recited in the appended claims.

I claim:

1. In an expansion bolt, the combination of a flat faced block having a V-shaped transverse slot and having a perforation through it the axis of which is parallel to said flat faces, a V-shaped wedge the faces of which form an angle less than the angle of said V-shaped slot, and means for forcing the wedge into the slot to expand the block into engagement with supporting surfaces, said means having a threaded stem extending through said perforation and projecting beyond the front face of the block.

2. In an expansion bolt, the combination of an expansible block having a soft metal face, a hard metal wedge, a bolt passing through both block and wedge, the wedge and bolt having interengaging shoulders to prevent relative rotation, the threaded shank of the bolt projecting beyond the block, a nut screwed thereupon reacting against the block and capable of drawing the wedge into the block through the agency of the bolt, accomplishing the expansion of said block first at its middle portion and subsequently at its free edge.

3. In an expansion bolt, a flat faced expansible block having soft metal faces, a transversely serrated hard metal wedge, a bolt passing loosely through both block and wedge, having its head fitting into a recess in the wedge, a nut upon the extended threaded shank, reacting against the block and capable, on turning, of drawing the transversely serrated hard metal wedge into the block causing the expansion thereof, said serrations of the wedge biting into the metal block and consequently holding the wedge, as well as preventing the slipping thereof when the nut is subsequently removed.

4. In an expansion bolt, a rectangular flat faced metal block, transversely slotted, said slot opening divergently outward to receive a metal wedge, a wedge having serrated faces disposed at an angle less than the divergent angle of the slot, a bolt passing loosely through both block and wedge, and a nut thereon engaging the edge of said block for drawing the wedge into the block, where it is held by its serrations when the nut is subsequently loosened.

5. In an expansion bolt adapted to be clamped in an opening, an expansible block having a slot therein provided with divergent portions, wedge means adapted to be received in the slot and having wedge surfaces so angularly disposed relative to the divergent portions of said slot as to contact initially with only the inner portions of the slot, and means for drawing said wedge means into the slot to spread the block first near the base of the slot and subsequently at the open end so as to initially force the block into clamping engagement with the walls of said opening at points intermediate the ends of the block.

In witness whereof, I hereunto subscribe my name this 19th day of May, 1928.

CARL F. RASMUSSEN.